United States Patent
Johnson

(10) Patent No.: US 6,447,072 B1
(45) Date of Patent: Sep. 10, 2002

(54) OIL-BATH WHEEL HUB

(76) Inventor: Lawrence N. Johnson, 12465 E. Olive Dr., Spokane, WA (US) 99216

( * ) Notice: Subject to any disclaimer, the term of this patent is extended or adjusted under 35 U.S.C. 154(b) by 0 days.

(21) Appl. No.: 09/770,059

(22) Filed: Jan. 25, 2001

(51) Int. Cl.$^7$ .......................... B60B 27/00; B60B 19/00; F16C 1/24; F16C 33/10
(52) U.S. Cl. .................. 301/108.2; 301/6.91; 384/376; 384/900
(58) Field of Search ...................... 301/108.1, 108.2 I, 301/108.3, 108.4, 6.3, 6.91, 37.25; 384/163, 900, 313, 317, 371, 375, 376, 385

(56) References Cited

U.S. PATENT DOCUMENTS

| | | | |
|---|---|---|---|
| 1,365,438 A | 1/1921 | Adamson | |
| 1,553,670 A | * 9/1925 | Cautley | 384/900 |
| 1,674,097 A | 6/1928 | Daubner | |
| 2,091,602 A | * 8/1937 | Le Jeune | 384/376 |
| 2,323,850 A | * 7/1943 | Scott | 384/376 |
| 3,064,982 A | 11/1962 | Stephens | |
| 3,077,948 A | 2/1963 | Law | |
| 3,089,738 A | 5/1963 | Steiner | |
| 3,177,041 A | 4/1965 | Isenbarger | |
| 3,316,022 A | 4/1967 | Isenbarger | |
| 3,331,638 A | 7/1967 | Fruth | |
| 3,395,950 A | 8/1968 | Brandt | |
| 3,893,690 A | 7/1975 | Yapp | |
| 3,903,992 A | 9/1975 | Chivukula | |
| 4,981,329 A | * 1/1991 | Koch et al. | 301/37.25 |
| 5,024,488 A | 6/1991 | Lindhuber | |
| 5,054,859 A | 10/1991 | Goettker | |
| 5,098,168 A | 3/1992 | Johnson | |
| 5,303,800 A | 4/1994 | Persson | |
| 5,505,525 A | 4/1996 | Denton | |
| 5,551,761 A | * 9/1996 | White | 301/6.91 |
| 6,273,519 B1 | * 8/2001 | Tsou | 301/108.2 |

* cited by examiner

*Primary Examiner*—S. Joseph Morano
*Assistant Examiner*—Jason R. Bellinger
(74) *Attorney, Agent, or Firm*—August E. Roehrig, Jr.; Hancock & Estabrook, LLP

(57) ABSTRACT

An oil-bath wheel spindle and hub assembly including a heat dissipating oil seal cap with a transparent window for observing the lubricant level and thermal conductive vanes forming a heat sink to transfer heat away from the wheel spindle and hub assembly to ambient atmosphere.

14 Claims, 4 Drawing Sheets

OIL-BATH WHEEL HUB

BACKGROUND OF THE INVENTION

1. Field of the Invention

This invention relates in general to wheel hub lubrication systems and, in particular, to an improved oil-bath wheel hub lubrication system that eliminates the necessity of an air vent to relieve excess internal pressure.

More specifically, but without restriction to the particular embodiment and/or use which is shown and described herein for purposes of illustration, this invention relates to an improved oil-bath wheel hub lubricating system that utilizes a heat sink incorporated into the structure of the lubricating system closure cap to dissipate heat build-up which occurs due to hard braking or extended travel over hot roadways.

2. Description of Related Art

As is known to those skilled in the art, trailer wheel and axle assemblies rotatably mount a vehicle wheel hub on a wheel spindle which is in turn supported by an axle connected to the trailer by springs. The wheel hub defines a cavity for containing a lubricant, grease or oil, to lubricate bearings carried by the wheel spindle, and upon which the wheel hub is mounted for rotational movement. While in all such wheel mountings it is preferable to keep moisture out of the wheel mounting structure, in the mounting of wheels on boat trailers the problems associated with moisture entering the mounting structure is exacerbated because of the frequency with which the trailer wheels are immersed in or submerged under water. Water, especially salt water, and other contaminants entering into the wheel hub lubrication cavity can quickly cause the wheel bearings to fail.

When boat trailer wheels are submerged in water shortly after extended travel over a roadway, or after continuous braking, the internal pressure within the sealed wheel hub mounting structure which increases because of heat build-up is suddenly decreased when the wheel hub is immersed in or submerged under water, thereby creating a negative pressure in the lubrication cavity which could draw water into the wheel mounting structure if the inner seal is not sealing correctly. The presence of water within this structure degrades the effectiveness of the lubricant, and can cause the internal components thereof to rust. Accordingly, many wheel hub mounting structures have been developed in an attempt to solve this problem.

One attempt to solve this problem is through the use of an oil-bath wheel spindle and hub assembly that has an open vent to the atmosphere to prevent internal pressure build-up, but which prevents water from entering into the interior of the wheel hub. Such a wheel hub and spindle assembly is disclosed in L. N. Johnson, U.S. Pat. No. 5,098,168, wherein there is disclosed a waterproof hub and spindle assembly having an air chamber open on the bottom and adapted to trap air therein as the hub and spindle assembly is submerged. The air in the chamber is compressed as submersion increases which pressurizes the lubricating chamber to prevent contaminants, such as water, from entering into the bearing structure. Another attempt to solve this problem is disclosed in D. B. Law, U.S. Pat. No. 3,077,948, wherein an excess supply of lubricant, such as wheel bearing grease, is maintained in an attachment to the wheel hub, and the grease supply is pressurized so that a supply of grease will be available for lubricating purposes so long as an adequate supply of grease is maintained in the attachment, and the appropriate pressure is applied with a grease gun just before launching.

While these and other such attempts have met with some success, the present invention addresses this problem by utilizing a structure which functions to dissipate heat build-up in the wheel hub, to thereby minimize or eliminate any internal pressure increase within the wheel hub due to heat build-up.

SUMMARY OF THE INVENTION

It is an object of this invention to improve wheel spindle and hub assemblies.

It is another object of this invention to improve wheel spindle and hub assemblies used on trailers by dissipating heat build-up in the wheel hub and spindle assembly to minimize or eliminate pressure increase within the lubricant containing cavity.

A further object of this invention is to maintain the integrity of the wheel spindle and hub seals of a trailer by preventing excessive heat build-up when the trailer is moving over a roadway or the trailer brakes are being applied.

Yet another object of this invention is to prevent a reduced pressure from being created within the lubricant containing cavity of a wheel spindle and hub assembly when a boat trailer is immersed water.

These and other objects are attained in accordance with the present invention wherein there is provided an oil-bath wheel spindle and hub assembly having a heat dissipating oil seal cap forming a heat sink to transfer heat away from the wheel spindle and hub assembly to ambient atmosphere.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

This and additional embodiments of the invention may now be better understood by referring to the following detailed description of the invention wherein the illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
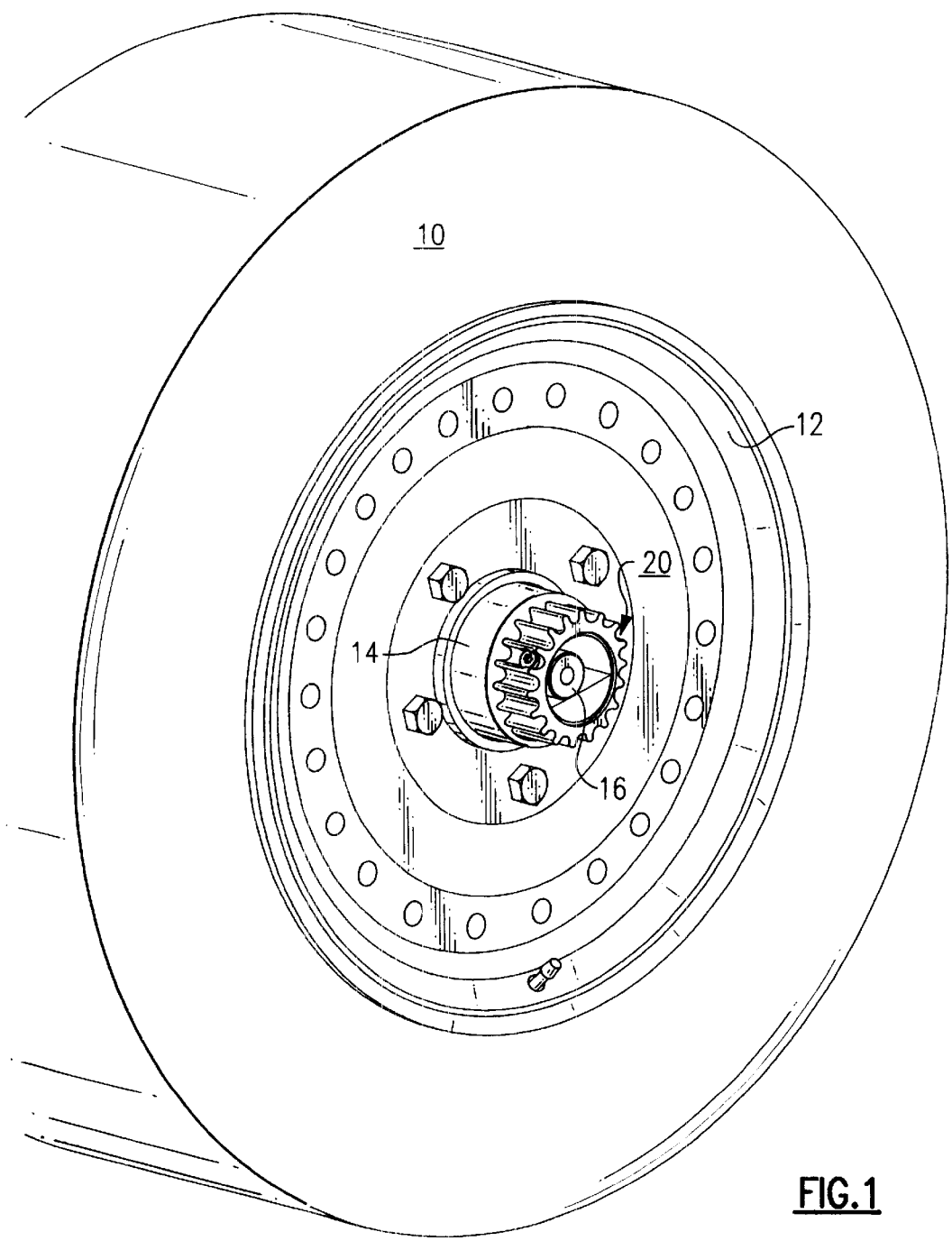
FIG. 1 is a frontal perspective view of a portion of a wheel having a spindle and hub assembly with an embodiment of the heat dissipating oil seal cap of this invention.

Referring now to the drawings, there is shown in FIG. 1 a tire 10, mounted on a rim 12, which in turn is bolted to a wheel hub 14 supported for rotation on a wheel spindle 16 by inner and outer bearings, not shown, as is known to those skilled in the art. The mounting of the wheel hub 14 for rotation about the spindle 16 forms a cavity between the interior surface of the hub 14 and the external surface of the spindle 16, which is sealed at both the inner and outer ends thereof by appropriate seals, not shown, to form a lubricant retaining chamber, as is also known to those skilled in the art. Such typical structures are illustrated in the inventor's prior U.S. Pat. No. 5,098,168, and in U.S. Pat. Nos. 3,064,982; 3,177,041 and 3,395,950. The lubricant receiving cavity forms a lubrication chamber 18 which carries there within a lubricant, or bearing oil, to reduce frictional forces of the wheel hub 14 rotating about the spindle 16.

Figure 2:
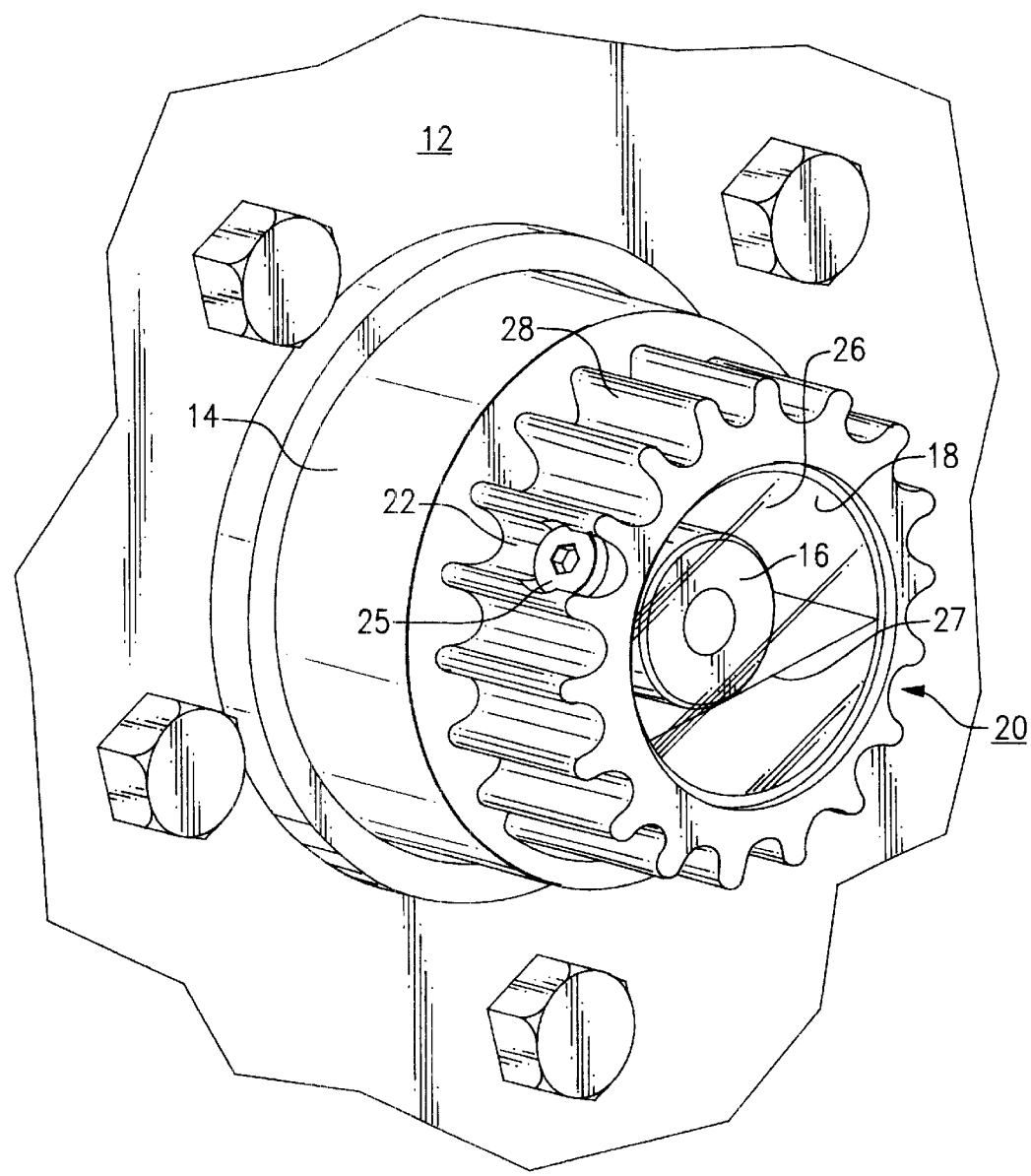
FIG. 2 is an enlarged perspective view of a portion of a wheel hub and spindle assembly with the heat dissipating oil seal cap illustrated in FIG. 1.
Figure 3:
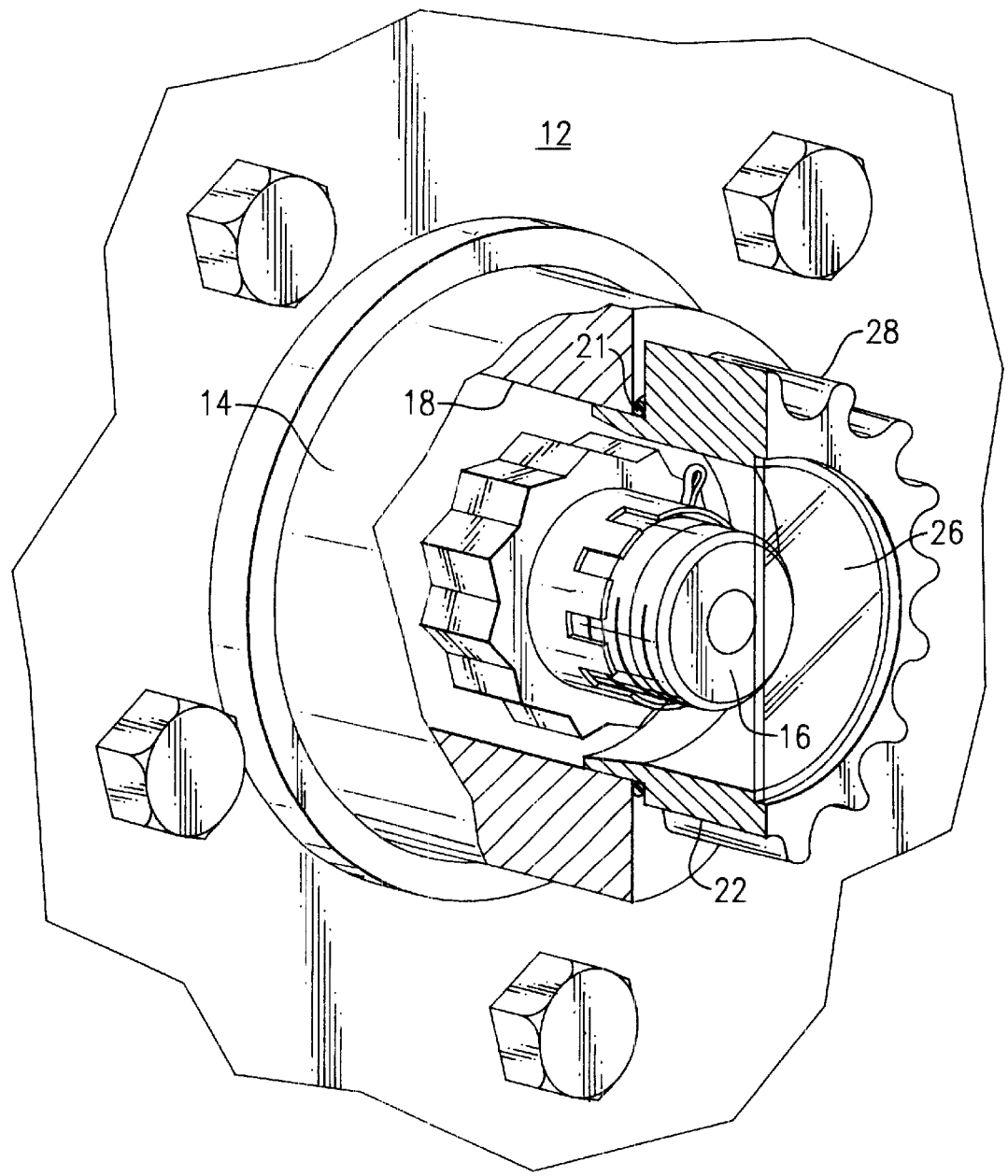
FIG. 3 is a perspective view of a portion of the wheel hub and heat dissipating oil seal cap illustrated in FIG. 2, with portions cut away to better illustrate a portion of the wheel spindle and the construction of the heat dissipating oil seal cap.
Figure 4:
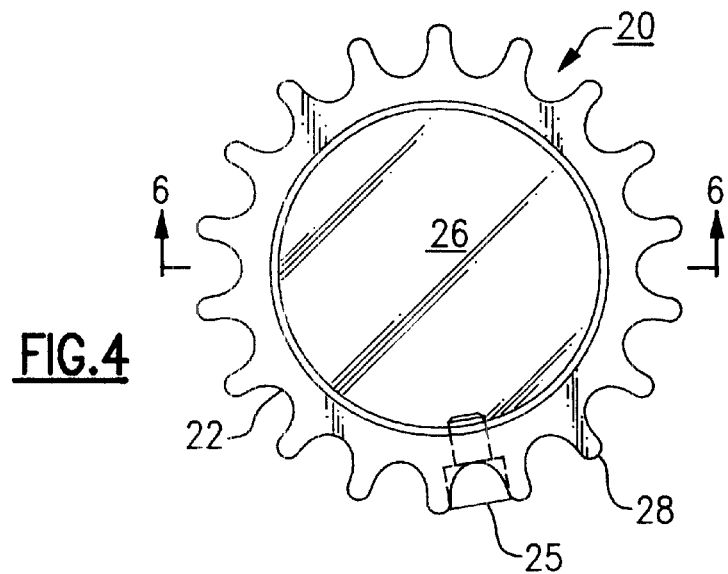
FIG. 4 is a frontal view of the heat dissipating cap illustrated in FIG. 1.
Figure 5:
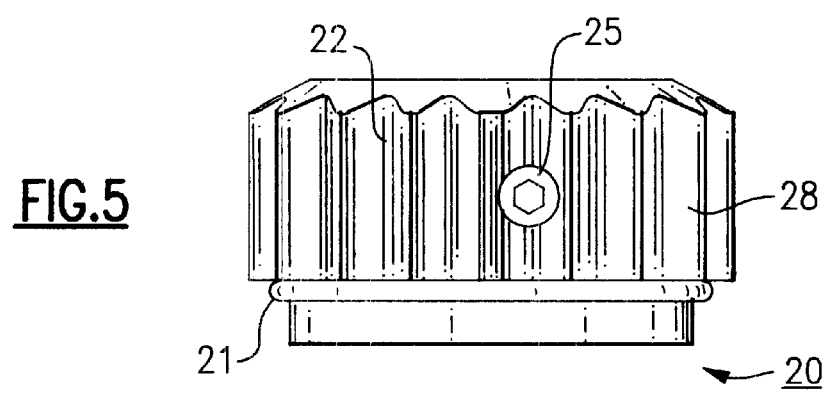
FIG. 5 is a side view of the heat dissipating cap illustrated in FIG. 4.
Figure 6:
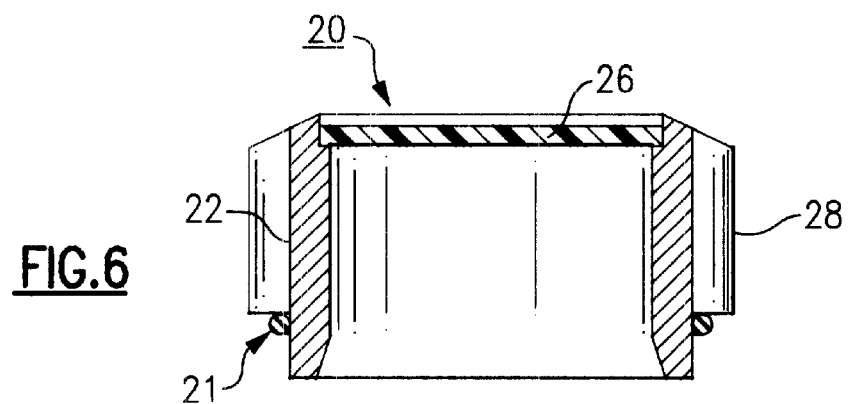
FIG. 6 is a cross sectional view of the heat dissipating cap illustrated in FIG. 4 taken along lines 6—6.

Referring now to FIGS. 2 and 3, there is illustrated an enlarged view of a portion of the wheel hub 14 and spindle 16 as shown in FIG. 1, to better illustrate an embodiment of a heat dissipating end cap 20. The heat dissipating end cap 20 is formed of a thermal conductive material and preferably press fit onto an outboard end of the wheel hub 14, but a threaded connection may also be used. A suitable seal such as an "O" ring 21, is positioned between the outboard opening in the wheel hub 14 and the inner end of the heat dissipating end cap 20 to form a closure of the outer end of the lubricant receiving cavity, or lubrication chamber 18, formed between the wheel hub 14 and the spindle 16.

The heat dissipating end cap 20 is formed with an opening which extends from an outer surface thereof 22 into the interior of the lubrication chamber 18 so that oil may be introduced into the lubrication chamber 18 to fill the lubrication chamber 18 to a desired level. A threaded closure, such as a threaded plug 25, forms a removable closure through which oil may be changed or added to the lubrication chamber 18. Unlike a grease filled lubrication chamber wherein you cannot pre-load the lubrication chamber on bearing cavity 18, the use of the oil bath of the instant invention permits a pressure pre-load of the bearing cavity or lubrication chamber 18, preferably between 5–10 ft. lbs.

To facilitate the maintenance of a proper quantity of oil within the lubrication chamber 18, the outboard face of the heat dissipating end cap 20 carries a transparent window 26 sealed thereto through which the oil level may be conveniently observed. For convenience, the transparent window 26 may be marked with a scribed circle or line 27 to provide a visual reference point to insure a proper amount of lubricant is contained within the lubrication chamber 18.

The outer surface 22 of the heat dissipating end cap 20 is formed with a plurality of finned structures 28, forming thermal conductive vanes, which increase the surface area of the end cap for dissipating heat build-up when the tire is moving over a roadway, or when the trailer is braking as occurs on hills and grades. While in the preferred embodiment the thermal conductive vanes 28 are formed with the vanes 28 lying in planes extending through the longitudinal axis of the wheel hub 14 and spindle 16 assembly, it is to be understood that the vanes 28 could also be formed in a ribbed configuration lying in planes extending normal to the longitudinal axis of the wheel hub 14 and spindle assembly 16.

In operation, as a trailer moves over a roadway, the rotation of the wheel hub 14 about the spindle 16 will "bathe" the lubrication chamber 18, and bearings carried within, with sufficient oil to maintain proper bearing operation within the lubrication chamber. While such movement insures dispensing of oil on all parts and moving surfaces, the movement also creates heat caused by the frictional forces generated by this rotation of the wheel hub 14 about the spindle 16. Accordingly, to minimize or eliminate such heat buildup, and the attendant internal pressure build-up, the thermal conductive vanes 28, formed on the outer surface 22 of the end cap 20, function as heat sinks to draw out heat generated within the lubrication chamber 18 and dissipate the heat into the atmosphere. In this manner the heat generated within the lubrication chamber 18 will be dissipated and can not cause the pressure within the lubrication chamber 18 to increase, thereby potentially blowing out the wheel bearing seals, or creating a negative pressure within the lubrication chamber 18 when the wheel hub 14 and spindle 16 assembly is rapidly cooled as the trailer wheel is immersed or submerged in water.

While this invention has been described in the specification and illustrated in the drawings with reference to preferred embodiments, the structures of which have been disclosed herein, it will be understood by those skilled in the art to which this invention if pertains that various changes may be made, and equivalents may be substituted for elements of the invention without departing from the scope of the claims. Therefore, it is intended that the invention not be limited to the particular embodiments disclosed in the specification and shown in the drawings as the best mode presently known by the inventors for carrying out this invention, nor confined to the details set forth, but that the invention will include all embodiments, modifications and changes as may come within the scope of the following claims:

It is claimed:

1. A vehicle wheel hub and spindle assembly comprising:
   a wheel spindle having supported thereon bearings for receiving a wheel hub;
   a wheel hub having an inboard and an outboard end;
   said wheel hub spaced from said wheel spindle and mounted on said bearings for rotational movement about said wheel spindle;
   said space between said wheel hub and said wheel spindle forming a lubrication chamber for containing a quantity of lubricant;
   seals carried by said wheel hub at said inboard and outboard ends for forming a lubricant tight seal of said lubrication chamber; and
   an end cap forming a closure of said lubrication chamber;
   said end cap having a plurality of thermal conductive vanes in heat conducting contact with said lubrication chamber for dissipating heat from said lubrication chamber to ambient atmosphere.

2. The vehicle wheel hub and spindle assembly of claim 1 wherein said end cap further includes a removable closure formed therein through which lubricant can be added to said lubricating chamber.

3. The vehicle wheel hub and spindle assembly of claim 1 wherein said end cap further includes a transparent window formed therein through which the level in said lubrication chamber is observable.

4. The vehicle wheel hub and spindle assembly of claim 3 further including indicia carried by said transparent window to provide a visual reference point to insure a proper amount of lubricant is carried within said lubrication chamber.

5. The vehicle wheel hub and spindle assembly of claim 1 wherein said thermal conductive vanes carried on said end cap lie in planes passing through a longitudinal axis of the wheel hub and spindle assembly.

6. The vehicle wheel hub and spindle assembly of claim 1 wherein said end cap is formed of a thermal conductive material.

7. In a vehicle wheel hub and spindle assembly wherein a wheel hub is rotatably mounted on a wheel spindle by bearings for rotation thereabout, and a space between the wheel hub and spindle forms a sealed lubricant retaining lubrication chamber, the improvement comprising:

an end cap forming an end of said sealed lubricant retaining lubrication chamber for retaining a quantity of lubricant in said sealed lubrication chamber, said end cap positioned in thermal contact with said lubrication chamber and having a plurality of thermal conducting vanes carried thereupon for dissipating heat contained within said lubricating chamber into ambient atmosphere.

8. The vehicle wheel hub and spindle assembly of claim 7 wherein said end cap further includes a removable closure formed therein through which lubricant can be added to or drained from said lubricating chamber.

9. The vehicle wheel hub and spindle assembly of claim 7 wherein said end cap further includes a transparent window formed therein through which a level of lubricant in said lubrication chamber is observable.

10. The vehicle wheel hub and spindle assembly of claim 9 further including indicia carried by said transparent window to provide a visual reference point to insure a proper amount of lubricant is carried within said lubrication chamber.

11. The vehicle wheel hub and spindle assembly of claim 7 wherein said thermal conductive vanes carried on said end cap lie in planes passing through a longitudinal axis of the wheel hub and spindle assembly.

12. The vehicle wheel hub and spindle assembly of claim 7 wherein said end cap is formed of a thermal conductive material.

13. The vehicle wheel hub and spindle assembly of claim 7 wherein said thermal conductive vanes carried on said end cap are radially extending from said end cap.

14. The vehicle wheel hub and spindle assembly of claim 13 wherein said radially extending thermally conductive vanes are circumferentially spaced about said end cap.

* * * * *